Sept. 22, 1931.  L. J. MEYER  1,824,288
LUGGAGE RACK FOR AUTOMOBILES
Filed July 25, 1930
Fig. 1.
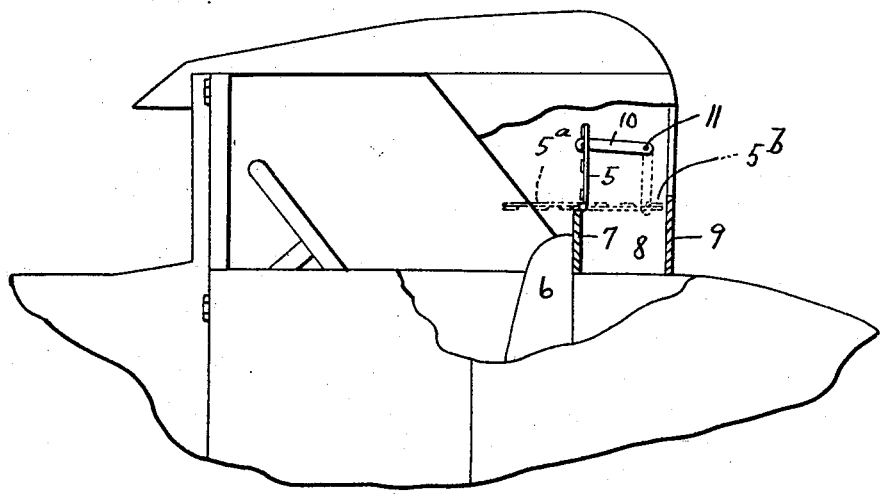
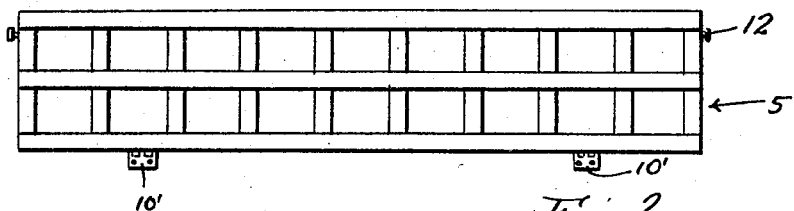
Fig. 2.
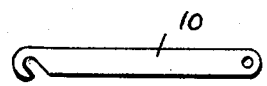
Fig. 3.
Inventor
Lewis J. Meyer
By Clarence A. O'Brien
Attorney Patented Sept. 22, 1931

1,824,288

UNITED STATES PATENT OFFICE

LEWIS J. MEYER, OF TERERRO, NEW MEXICO

LUGGAGE RACK FOR AUTOMOBILES

Application filed July 25, 1930. Serial No. 470,731.

This invention relates to luggage racks for automobiles and particularly to a rack to be disposed in a space usually provided behind the seat in a coupé or roadster which is commonly used for carrying packages and small articles.

The invention has particular reference in providing a rack of this type which may increase the available carrying capacity of said space, and which may form a guard for retaining the articles therein from falling out or being blown away as very frequently happens when the windows of the car are open.

It is an object of the invention to provide a frame or rack which is hinged in any suitable manner to the back of the seat adjacent said carrying space and may be disposed in horizontal or upright position.

It is also an object of this invention to provide a rack of this type which may be mounted to an auxiliary strip secured to the back of a seat to increase the available space for carrying purposes.

It is also an object of this invention to provide a device which may be fitted to accommodate the carrying surface to different cause.

It is also an object of the invention to provide straps which may be made of chain, leather, or rigid straps of iron or the like similar to the hinged straps used to support an open trunk lid.

It is also an object of the invention to provide a rack of this type which may be constructed of scrap iron riveted or welded together, which may be made of wood, a combination of metal and wood, and which may be or may not be covered with leather or cloth, or the like and which may be formed with open spaces through which small articles may be dropped through to the carrying space without moving said frame.

It is also an object of the invention to provide a device which may be made of any suitable size or shape and to conform for the purpose which is intended and to form a luggage carrier and support and guard combined in a rack for attachment in a luggage carrying space indicated.

These and other objects, the nature of the invention, its composition and arrangement and combination of parts, may be readily understood from a reading of the following description of the drawings, in which:—

Figure 1 shows a conventional coupé cab provided with the mentioned luggage carrying space in which is installed one embodiment of my improved rack member.

Figure 2 illustrates the top plan view of one preferred embodiment of my improved rack.

Figure 3 illustrates the form of one of the straps which are used to maintain said rack in the desired position.

It is to be understood that I do not desire to confine the application of this invention to the particular embodiment set forth herein and illustrations thereof, but any change or changes may be made consistent with the spirit and scope of the invention.

Referring in detail to the drawings 5 designates a preferred embodiment of my improved rack, 6 generally designates a seat coupé cab, the numeral 7 designates a strip attached to the rear of said seat, to form the front wall of the space 8 back of said seat, the rear wall of said space indicated as 9 comprising the back of the cab. The rack is provided with hinges 10′ on one longitudinal edge which are secured to the top edge of the strip 7 as illustrated in Figure 1 and to permit said rack 5 to be disposed in forward or rearward horizontal position as shown at 5a and 5b, respectively, or to be disposed in vertical position as shown in Figure 1. Straps 10 which may be of metal, leather or chain or other suitable construction are hinged to the inside of the rear portion of the cab as at 11 to support the rack in vertical or rearward horizontal position. The straps 10 engage projections 12 on the sides of the rack near the front edge thereof opposite the edge carrying hinges 10′. It will be obvious that the rack may be disposed in the various positions stated, either to increase the available storage space or carrying space or to confine articles within the compass of the original storing or carrying space and permit them being disbursed therefrom.

The construction of the preferred embodiment of my improved rack disclosed in Figure 2 comprises a tray consisting of a plurality of parallel spaced members connected by parallel spaced transverse cleats which form a grill work. Various formations and construction may be used for the rack, and various materials and finishes may be used as desired.

It is thought that it will now be obvious that I have provided a device of the character described, which consists of a useful construction for the purpose described, which is simple and inexpensive to manufacture, and capable of wide variations of materials used for its construction, and which provides a convenient and valuable accessory for racks of the type described, which constitutes a substantial contribution to the art to which it relates, and is otherwise admirably suited for the purpose for which it is designed.

What is claimed is:—

In an automobile of the coupé type, a vertical member at the top of the rear part of the back of the seat thereof spaced from the rear wall of the body of the vehicle, an elongated rack, hinges connecting one edge of the rack to the top part of said vertical member, one leaf of each hinge being connected to the upper edge of said vertical member with the hinge pin at the rear edge of the leaf, whereby the rack will be supported in a horizontal position by the upper edge of the vertical member when the rack is swung forwardly, a pair of links pivoted one to each side wall of the body of the vehicle adjacent the back of the body and above the horizontal plane of the top edge of the vertical member, each link having a hook at its free end and projections on the ends of the rack adjacent the free edge thereof for engagement by the hooks of the links for holding the rack either in a vertical position or a horizontal position, in the latter horizontal position the rack extends rearwardly over the space between the vertical member and the rear wall of the back.

In testimony whereof I affix my signature.

LEWIS J. MEYER.